UNITED STATES PATENT OFFICE.

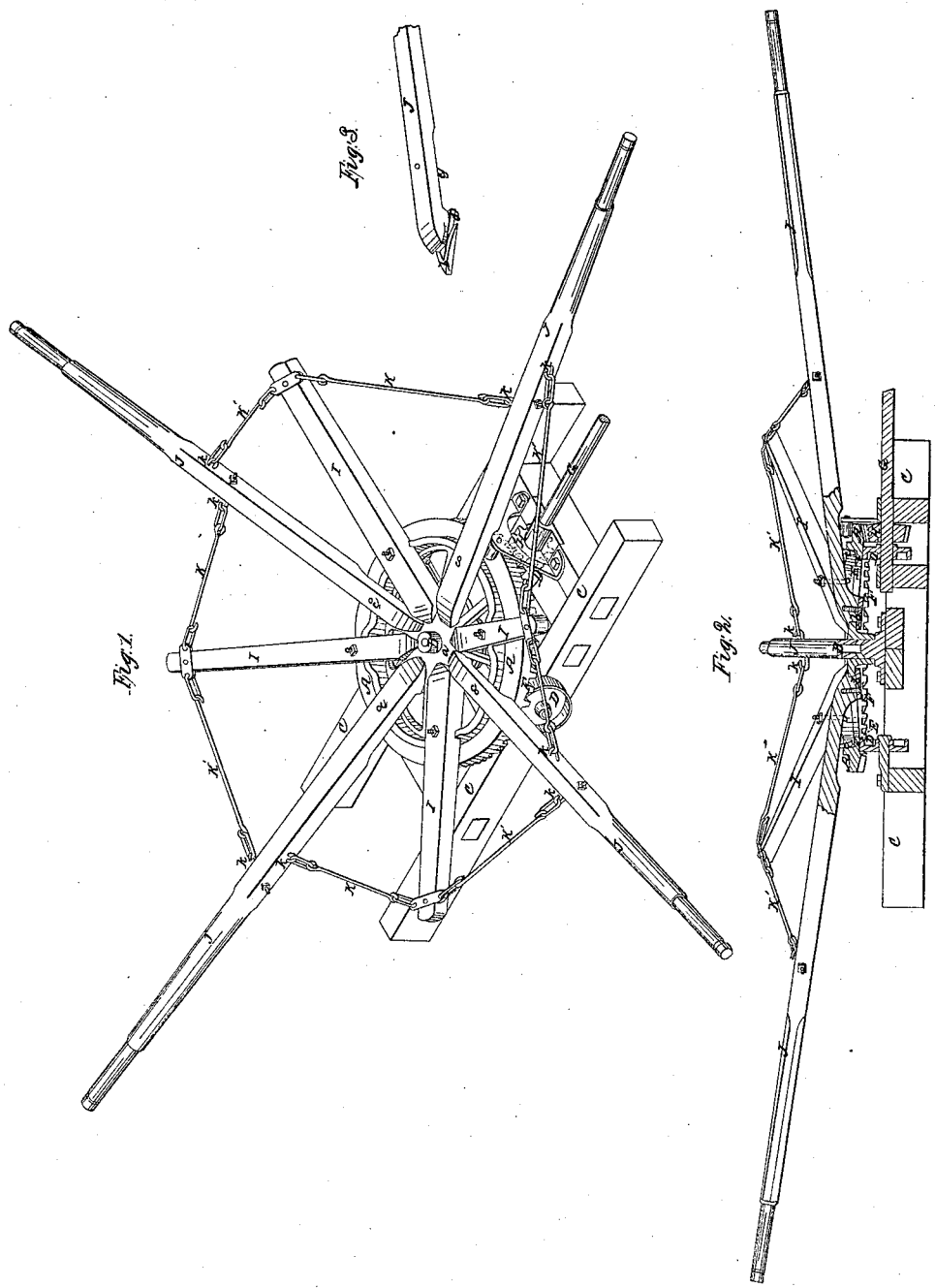

CYRUS ROBERTS, OF BELLEVILLE, ILLINOIS.

ATTACHING THE ARMS OF HORSE-POWERS.

Specification of Letters Patent No. 16,612, dated February 10, 1857.

*To all whom it may concern:*

Be it known that I, CYRUS ROBERTS, of Belleville, in the county of St. Clair and State of Illinois, have invented certain new and useful Improvements in Portable Horse-Powers, of which the following is a full, clear, and exact description, reference being had to the accompanying drawing, which makes part of this specification, and in which—

Figure 1, represents a view in perspective of a horse power embracing my said improvements; Fig. 2, represents a vertical section of the same, and Fig. 3, represents a fragment of one of the draft levers, showing the shoe which interlocks with the spokes of the master wheel.

My invention and improvement relates to that class of portable horse powers in which the main or master wheel is horizontal, revolves on a vertical axis, and is fitted with radial sweeps or levers attached rigidly to, or bearing rigidly against stops on its rim to the outer end of which sweeps the horses are harnessed, and by which they draw, as they travel around and around, in a circle to turn the wheel. As these sweeps bear rigidly against the rim of the master wheel any sudden jerk or pull of the horses, imparts a corresponding shock to the wheel and tends to break its teeth and those of the pinion, and likewise tends to lift the teeth of the wheel out of gear with those of the pinion, because the lines of draft of the horses upon the sweeps and of the sweeps upon the wheel are upward, at an angle varying from 10 to 20 degrees according to the length of the sweeps, the manner in which the horses are attached to them, and the height of the horses.

To remedy these defects is the object of my invention which consists in attaching rigidly to the master wheel a series of radial arms rising from the plane of the wheel at a considerable angle, say from 20° to 40° according to their length and placing a sweep between each pair of these arms rising from the plane of the wheel at an angle about half that at which the arms rise. The inner end of the sweep being attached to the wheel in such manner that its outer end will be free to rise and fall, and move to and fro, between the arms. The sweep has a link or chain extending from near its middle on each side to the outer ends of the adjacent arms; by these links the sweep is suspended at the proper elevation; and when the horses draw upon the outer end of the sweep the latter draws upon the link behind the sweep; the link draws upon the arm, and the arm upon the wheel, and, as the point at which the link is attached to the sweep is much lower than that at which it is attached to the arm, the pull upon the latter will be downward, and tend to hold the wheel in gear with the pinion of the line shaft, while the horses are crossing that shaft, at which time, almost exclusively, they take fright, and jump and pull violently.

The downward pull upon the arms diminishes gradually as the draft increases, and vice versa, by reason of the links behind the sweep which connect it to the arm behind, and the traces of the horses in front of the sweep, forming a catenary whose points of suspension are the shoulders of the horse in front and the outer end of the arm behind, the lower portion of the curve of which catenary will sink, and its ends or points of suspension approach, as the pull slackens, while its ends will recede and the lower part of the curve rise, but without ever reaching a straight line, as the pull increases. This rising and falling of the lower portion of the catenary will of course raise and lower the sweep, as the transverse line of the latter forms the lowermost link of the catenary, and connects the traces in front of the sweep, with the links behind the same. This property possessed by the catenary of rising and lowering and lengthening and shortening like a spring, as the pull varies, breaks the concussion, that otherwise would result from a sudden jerk or pull of the horses, and thus not only protect the wheels from breaking, but also protect the shoulders of the horses from the injuries to which they are so liable when pulling on a sweep rigidly connected to the wheel.

The accompanying drawing represents a horse power in which a horizontal master wheel (A), is stepped upon a vertical pivot (B) bolted by its flange to the cross timbers of the main frame C, while the rim of the wheel rests upon anti-friction rollers (D) arranged so as to run on a flat plane or track (E) on the inside of the circle of cogs F. A horizontal shaft (G) whose journals are supported in bearings on the main frame, transmits motion from the master wheel to the machinery to be driven by the horse power. On the inner end of the shaft G, there is a bevel pinion (H) which matches with the cogs of the master wheel. Directly over the pinion, one or more anti-friction rollers are sustained by a standard, so as to bear upon the top of outer edge of the rim of the master wheel, to keep the cogs of the latter in gear with those of the pinion.

The master wheel is fitted with a suitable number (in this instance four) of radial arms (I), each about half the length of the sweeps and springing from the hub $a$, and rising therefrom at an angle of about 30°, to the plane of the wheel; they are also equidistant. These arms are secured firmly to the wheel by notching their inner ends onto a flanch of the hub, and bolting them at a short distance from their inner ends to lugs on the rim. Between each of the arms I, a sweep or lever J, is introduced to the outer end of which the horse is harnessed. Each sweep is provided at its inner end with a triangular shoe ($b$) having rabbet ($d$) on its edges (as shown in Fig. 3) the vertical sides of the rabbet fit in the angle between the spokes, and the horizontal sides lap under the spokes, while the upper side of the inner end of the lever laps over the spokes; by this means the inner end of the lever is held from rising, falling, or moving laterally, but left free to turn as a universal hinge, to permit the outer end of the lever to rise and fall, as well as to move to and fro, as the curve of the catenary rises and falls. A pin ($c$) passes down through the lever and projects from its under side on the inside of the rim of the wheel to prevent the lever from being drawn out by any accidental endwise pull. Each of these sweeps radiate outward and upward, at an angle of 15°, in this instance, where the arms are have their length and rise at an angle of 30°, these are the angles which in the experiments I have tried I have found best, but of course I do not wish under other circumstances, to confine myself to these angles, if others should be preferable. These sweeps extend out about twice the length of the arms which gives room for the horses to walk outside of the arms. In this position each sweep, when the machine is at rest, is suspended between the ends of two adjacent arms (I) by means of a chain or link rods (K), reaching from the ends of the arms to hooks ($k$), on the sides of the sweep, but, when the machine is in motion, the sweep will be suspended behind to the arm (I), by the link (K′) and in front by the traces, to the shoulders of the horses, the traces are on one side and the links on the other, descending from their respective points of suspension toward the sweep. By this method of suspending the sweeps and relieving them from sudden jerks of the horses, they as well as every part of the machine, may be made lighter than those of other horse powers in which the sweeps are rigidly attached to the wheel.

Having thus described my improved portable horse-power, what I claim therein as new, and desire to secure by Letters Patent, is—

The combination of the radial rigid arms and intermediate hinged and suspended sweeps, with the master wheel, substantially as herein set forth.

In testimony whereof, I have hereunto subscribed my name.

CYRUS ROBERTS.

In presence of—
  F. G. FONTAINE,
  A. E. H. JOHNSON.